United States Patent [19]

Ueda et al.

[11] Patent Number: 4,599,380

[45] Date of Patent: Jul. 8, 1986

[54] POLYPHENYLENE ETHER RESIN COMPOSITION

[75] Inventors: Sumio Ueda, Yokohama; Kunio Fukuda, Chigasaki, both of Japan

[73] Assignee: Asahi Kasei Kogyo Kabushiki Kaisha, Osaka, Japan

[21] Appl. No.: 644,595

[22] Filed: Aug. 27, 1984

Related U.S. Application Data

[63] Continuation-in-part of Ser. No. 471,845, Mar. 3, 1983, abandoned.

[30] Foreign Application Priority Data

Mar. 9, 1982 [JP] Japan ................................. 57-35836

[51] Int. Cl.⁴ ............................................. C08L 61/04
[52] U.S. Cl. ..................................... 525/68; 525/289; 525/290; 525/315; 525/316; 525/905
[58] Field of Search .................................. 525/68, 905

[56] References Cited

U.S. PATENT DOCUMENTS 3,383,435  5/1968  Cizek et al. ........................... 525/68
3,833,688  9/1974  Abolins et al. ........................ 525/68
4,260,618 11/1982  Trementozzi ......................... 525/68

FOREIGN PATENT DOCUMENTS 17812  7/1967  Japan .................................... 525/68

Primary Examiner—Jacob Ziegler
Attorney, Agent, or Firm—Armstrong, Nikaido, Marmelstein & Kubovcik

[57] ABSTRACT

A polyphenylene ether resin composition comprising a polyphenylene ether resin and a rubber modified resin, said rubber modified resin containing a discontinuous elastomeric rubber phase dispersed in a continuous resin phase comprising a copolymer of a vinyl cyanide compound and a vinyl aromatic compound or a mixture of a homopolymer of a vinyl aromatic compound and a copolymer of a vinyl cyanide compound and a vinyl aromatic compound, said elastomeric rubber phase comprising a grafted elastomeric rubber which has a graft phase of a copolymer of vinyl cyanide compound and a vinyl aromatic compound and having a grafting degree of 35 to 300% by weight, the contents of vinyl cyanide compound in the graft phase and resin phase being 12 to 30% by weight and 3 to 10% by weight, respectively. The polyphenylene ether resin composition of the present invention is excellent in solvent resistance and colorability as well as impact strength.

22 Claims, No Drawings

POLYPHENYLENE ETHER RESIN COMPOSITION

This application is a continuation-in-part of our U.S. patent application Ser. No. 471,845 filed on Mar. 3, 1983 now abandoned.

This invention relates to a polyphenylene ether resin composition. More particularly, the present invention is concerned with a polyphenylene ether resin composition comprising a polyphenylene ether resin and a rubber modified resin which composition is excellent in resistance to aggressive solvents and colorability.

It is well known that polyphenylene ether resins are excellent in mechanical properties and electrical properties such as electric insulation properties. Further, polyphenylene ether resins are low in water absorption and have a good dimensional stability. In addition to the above-mentioned excellent properties, it is noted that disadvantageous properties of polyphenylene ether resins such as poor moldability and poor impact strength have been successfully eliminated by blending them with a high impact polystyrene. Therefore, in recent years, such polyphenylene ether resins have begun to be used for a wide variety of applications. However, both of polyphenylene ether resins and polyblends of polyphenylene ether resins with a high impact polystyrene have a fatal drawback, namely poor resistance to organic solvents such as acetone, hexane, cyclohexane and gasoline, machine oils and grease. When polyphenylene ethers and polyblends thereof with a high impact polystyrene are contacted with the above-mentioned substances, crazing is caused. Particulary, their stress crack resistance is low. That is, these resins easily fail by breaking when exposed to mechanical stress while being in contact with the above-mentioned substances.

Meanwhile, as polyphenylene ether resins and resin compositions comprising a polyphenylene ether and a high impact polystyrene are widely used, it is strongly desired to give them colors possessing various hues. However, those resins and resin compositions are poor in colorability. Particularly, it is difficult to give them colors possessing a vivid hue.

Heretofore, various proposals have been made to improve stress crack resistance of polyphenylene ether resins and polyphenylene ether resin compositions. For example, U.S. Pat. Nos. 3,819,761 and 3,976,725 each propose the use of a high molecular weight polystyrene; U.S. Patent No. 3,994,856 proposes the addition of A-B-A' type elastomeric block copolymer; and U.S. Patent 4,167,507 proposes the addition of a hydrogenated block copolymer. However, by these expedients, not only a satisfactory improvement with respect to stress crack resistance cannot be achieved but also mechanical properties, e.g., rigidity are spoiled.

U.S. Pat. No. 3,383,435 discloses a composition comprising a acrylonitrile-butadiene-styrene copolymer (hereinafter often referred to as "ABS resin") and poly(2,6-dimethyl-1,4-phenylene)ether. In example of U.S. Pat. No. 3,383,435, composition samples are prepared from a polyphenylene ether resin and an ABS resin comprising 16% acrylonitrile units, 41% styrene units, and 43% butadiene units. However, as is apparent from the comparison, described in example of U.S. Pat. No. 3,383,435, of the properties of the resulting compositions with those of a composition comprising a polyphenylene ether and a polystyrene or a composition comprising a polyphenylene ether and a high impact polystyrene, the resulting compositions are too brittle to use for practical purposes. This is attributable to a poor compatibility between an ABS resin and a polyphenylene ether.

Meanwhile, as mentioned above, a polyphenylene ether resin and a polyblend of a polyphenylene ether resin with a styrene resin are poor in colorability. Accordingly, improvement of colorability of the above-mentioned resin or polyblend has been desired in the art. U.S. Pat. No. 4,060,514 discloses a method of reducing the color of polyphenylene ether. But, heretofore, there have been made no proposals with respect to methods of improving colorability of the resin composition comprising a polyphenylene ether resin and a polystyrene.

The present inventors have made extensive and intensive studies on a resin composition comprising a rubber modified resin and a polyphenylene ether resin, particularly on a rubber modified resin containing a vinyl cyanide compound and the structure and effect thereof. As a result, the present inventors have surprisingly found that a resin composition comprising a polyphenylene ether resin and a specific rubber modified resin containing a vinyl cyanide compound is excellent in not only impact strength but also solvent resistance and colorability. The present invention has been made based on such a novel finding.

Accordingly, it is an object of the present invention to provide a polyphenylene ether resin composition having an excellent colorability and an excellent resistance to aggressive solvents as well as a high impact strength.

The foregoing and other objects, features and advantages of the present invention will be apparent to those skilled in the art from the following detailed description and appended claims.

According to the present invention, there is provided a polyphenylene ether resin composition comprising:

(A) 10 to 80% by weight of a polyphenylene ether resin, and (B) 90 to 20% by weight of a rubber modified resin, said rubber modified resin containing a discontinuous elastomeric rubber phase dispersed in a continuous resin phase comprising a copolymer of a vinyl cyanide compound and a vinyl aromatic compound or a mixture of a homopolymer of a vinyl aromatic compound and a copolymer of a vinyl cyanide compound and a vinyl aromatic compound, said elastomeric rubber phase comprising a grafted elastomeric rubber which has a graft phase of a vinyl cyanide compound copolymerized with a vinyl aromatic compound, said elastomeric rubber phase having a grafting degree of 35 to 300% by weight, said grafting degree being defined by the formula:

$$G = \frac{A - R}{R} \times 100$$

wherein G represents the grafting degree, % by weight; R the amount of rubber contained in one gram of the rubber modified resin, gram; and A the amount of the elastomeric rubber phase contained in one gram of the rubber modified resin, gram, said graft phase containing 12 to 30% by weight of the vinyl cyanide compound based on the total amount of the vinyl cyanide compound and the vinyl aromatic compound present in the graft phase, said continuous resin phase containing 3 to 10% by weight of the vinyl cyanide compound based on the amount of the continuous resin phase.

In a preferred composition of the present invention, the polyphenylene ether resin as component(A) is a homopolymer comprising a repeating structural unit represented by the formula(I) or a copolymer comprising a repeating structural unit represented by the formula(I) and a repeating structural unit represented by the formula(II):

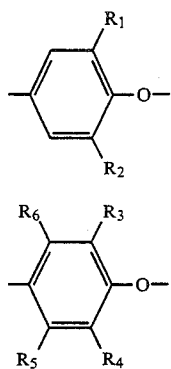

wherein $R_1$, $R_2$, $R_3$, $R_4$, $R_5$ and $R_6$ each independently represent a monovalent substituent selected from the group consisting of an alkyl group having 1 to 4 carbon atoms excluding a tert-butyl group; an aryl group; a halogen atom; and a hydrogen atom, provided that $R_5$ and $R_6$ do not simultaneously represent a hydrogen atom.

As illustrative examples of a homopolymer comprising a repeating structural unit represented by the above formula(I), there may be mentioned poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)-ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)-ether, poly(2-methyl-6-chloroethyl-1,4-phenylene)ether and the like. Of the above-mentioned homopolymer type polyphenylene ethers, the most preferred one for the purposes of the present invention is poly(2,6-dimethyl-1,4-phenylene)-ether.

The polyphenylene ether resin comprising a copolymer of a repeating structural unit represented by the above formula (I) and a repeating structural unit represented by the above formula(II) includes a polyphenylene ether copolymer produced by copolymerising an alkyl-substituted phenol, such as 2,3,6-trimethylphenol, represented by the formula

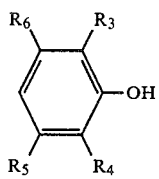

(wherein $R_3$, $R_4$, $R_5$ and $R_6$ each are as defined above) with o-cresol or the like. Of the above-mentioned copolymer type polyphenylene ether resins, the most preferred one for the purposes of the present invention is a copolymer of 2,6-dimethylphenol and 2,3,6-trimethylphenol.

As mentioned above, the polyphenylene ether resin composition of the present invention comprises a polyphenylene ether resin [component(A)]and a rubber modified resin [component (B)]. Where the amount of the polyphenylene ether resin contained in the polyphenylene ether resin composition is less than 10% by weight based on the components (A) and (B), the heat resistance characteristic of the polyphenylene ether is spoiled and, hence, such a composition cannot be put to practical use. On the other hand, where the amount of the polyphenylene ether resin is more than 80% by weight based on the components (A) and (B), the processability of the composition is drastically lowered. Therefore, the amount of the polyphenylene ether resin contained in the composition of the present invention should be within the range of 10 to 80% by weight based on the components (A) and (B).

As mentioned above, the rubber modified resin as component (B) of the polyphenylene ether resin composition of the present invention contains a discontinuous elastomeric rubber phase dispersed in a continuous resin phase comprising a copolymer of a vinyl cyanide compound and a vinyl aromatic compound or a mixture of a homopolymer of a vinyl aromatic compound and a copolymer of a vinyl cyanide compound and a vinyl aromatic compound. The elastomeric rubber phase comprises a grafted elastomeric rubber which has a graft phase of a copolymer of a vinyl cyanide compound and a vinyl aromatic compound. In a preferred composition of the present invention, the vinyl aromatic compound as the monomer unit of the homopolymer and as one of the monomer units constituting the copolymer is at least one member selected from the group of compounds represented by the formula:

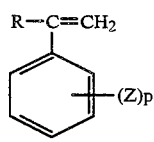

wherein R represents a hydrogen atom, a halogen atom or an alkyl group; Z a hydrogen atom, a halogen atom, a vinyl group or an alkyl group; and p an integer of 1 to 5. As more preferable vinyl aromatic compounds, there may be mentioned at least one member selected from the group consisting of styrene, α-methylstyrene, vinyltoluene, vinylethylbenzene, vinylxylene, tert-butylxylene and chlorostyrene. Of the above-mentioned vinyl aromatic compounds, most preferred are styrene and a mixture of styrene and α-methylstyrene. As the mixture of styrene and α-methylstyrene, a mixture of 20 to 80% weight of styrene and 80 to 20% by weight of α-methylstyrene is preferred.

The vinyl cyanide compound as one of the monomer units constituting the copolymer in the rubber modified resin component is at least one member selected from the group of compounds represented by the formula:

wherein R' represents a hydrogen atom or an alkyl group having 1 to 4 carbon atoms. As representative examples of the vinyl cyanide compounds represented by the above formula, there may be mentioned at least one member selected from the group consisting of acrylonitrile, methacrylonitrile, α-ethylacrylonitrile, α-propylacrylonitrile, α-butylacrylonitrile and the like. Of the above-mentioned vinyl cyanide compounds, at least one member selected from the group consisting of acrylonitrile and methacrylonitrile is preferable and acrylonitrile is most preferable.

In the elastomeric rubber phase of the rubber modified resin, it is important that in order to impart high impact strength, excellent solvent resistance and colorability to the polyphenylene ether resin composition, not only the grafting degree (which will be defined later) of the elastomeric rubber phase be within a specific range, but also the respective contents of vinyl cyanide compound in the graft phase and resin phase be within specific ranges. Specifically, where the content of vinyl cyanide compound in the graft phase is less than 12% by weight based on the total amount of the vinyl cyanide compound and the vinyl aromatic compound present in the graft phase, the colorability and solvent resistance of the polyphenylene ether resin composition are insufficient. On the other hand, where the content of vinyl cyanide compound in the graft phase is more than 30% by weight, both the colorability and impact strength of the polyphenylene ether resin composition are lowered. Accordingly, in the present invention, the content of vinyl cyanide compound in the graft phase is within the range of 12 to 30% by weight. Where the grafting degree of the elastomeric rubber phase is less than 35% by weight, the colorability and impact strength as well as solvent resistance of the polyphenylene ether resin composition are poor. On the other hand, the upper limit of the grafting degree is generally 300% by weight in view of the present techniques for attaining a high grafting degree and from the standpoints of desired impact strength and processability of the polyphenylene ether resin composition. In the preferred composition of the present invention, the graft phase of the grafted elastomeric rubber phase in the rubber modified resin comprises two classes of copolymers, namely, (a) a copolymer of a vinyl cyanide compound and a vinyl aromatic compound containing a vinyl cyanide compound in an amount of 3 to 15% by weight based on the copolymer and (b) a copolymer of a vinyl cyanide compound and a vinyl aromatic compound containing a vinyl cyanide compound in an amount of 16 to 40% by weight based on the copolymer, the average content of vinyl cyanide compound moiety in the two classes of copolymers being 12 to 30% by weight based on the total amount of the copolymers present in the graft phase. In such a graft phase, it is preferred that the two classes of copolymers have a weight ratio (a)/(b) of 9/1 to 1/9, more preferably 4/1 to 1/4. Where the elastomeric rubber phase in the rubber modified resin comprises a grafted elastomeric rubber which has the graft phase comprising the above-mentioned two classes of copolymers, the polyphenylene ether resin composition of the present invention is extremely excellent in both of impact strength and solvent resistance.

As mentioned above, with respect to the continuous resin phase in the rubber modified resin, it is requisite that the copolymer of a vinyl cyanide compound and a vinyl aromatic compound in the continuous resin phase have a vinyl cyanide compound in an amount of 3 to 10% by weight based on the amount of the continuous resin phase. Where the content of the vinyl cyanide compound in the resin phase is less than 3% by weight, the colorability and solvent resistance of the polyphenylene ether resin composition are lowered. On the other hand, where the content of the vinyl cyanide compound in the resin phase exceeds 10% by weight, the impact strength of the polyphenylene ether resin composition is remarkably lowered. In the present invention, the rubber of the elastomeric rubber phase may be any polymeric materials which are elastic. The term "rubber" as used in the present invention, therefore, includes, natural or synthetic rubbers of the diene elastomer type, copolymers of such dienes with other monomers, and other homopolymers and copolymers which are elastic. Illustrative examples of the rubber as mentioned above include a polybutadiene, a styrene-butadiene copolymer, a butadiene-acrylonitrile copolymer, a styrene-butadiene block copolymer, a hydrogenated product of the styrene-butadiene block copolymer, an ethylene-propylene-ethylidene norbornene terpolymer, an ethylene-propylene-dicyclopentadiene terpolymer, a polyalkyl acrylate, a polyisoprene, a natural rubber and the like. The rubber of the elastomeric rubber phase may be at least one member selected from the group consisting of the above-mentioned rubbers. Of the above-mentioned rubbers, preferred is at least one member selected from the group consisting of a polybutadiene, a styrene-butadiene copolymer, an ethylene-propylene-ethylidene norbornene terpolymer and an ethylene-propylene-dicyclopentadiene terpolymer. The rubber modified resin as component (B) of the polyphenylene ether resin composition of the present invention comprises 1 to 74% by weight, preferably 5 to 50% by weight of a rubber, 3 to 23% by weight, preferably 5 to 15% by weight of a vinyl cyanide compound and 18 to 96% by weight, preferably 30 to 85% by weight of a vinyl aromatic compound, the total amount of the rubber, the vinyl cyanide compound and the vinyl aromatic compound being 100% by weight. The amount of rubber of the elastomeric rubber phase may be within the range of 1 to 25% by weight based on the total amount of components(A) and (B). The suitable amount of the rubber may be chosen from the above-mentioned range according to the intended impact strength of the polyphenylene ether resin composition.

The method for the production of a rubber modified resin as component(B) is not critical as far as the resulting rubber modified resin meet the above-mentioned requirements with respect to the grafting degree and the vinyl cyanide compound content of each of the graft phase and resin phase. For example, the rubber modified resin may be prepared by a generally known polymerization technique such as emulsion, bulk, solution or suspension polymerization. Further, the rubber modified resin may be produced by the following method. Copolymerization of a vinyl cyanide compound with a vinyl aromatic compound is carried out in the presence of a rubber to form a rubber grafted with a copolymer of a vinyl cyanide compound and a vinyl aromatic compound. Separately, a vinyl cyanide compound and a vinyl aromatic compound are copolymerized to form a diluting resin. Subsequently, the obtained grafted rubber and diluting resin are mixed with each other to form a rubber modified resin. With respect to this method, a more specific explanation will be given later.

With respect to the analysis of rubber modified resins, there are various methods, e.g. methods as described in J. Polymer Sci., $A_3$, 3825 (1965), and Rubber Chem. & Technology, 38, No. 3, 655 (1965). In the present invention, the fractionation of discontinuous elastomeric rubber phase and continuous resin phase, and the determination of the grafting degree of the elastomeric rubber phase were made according to the following method. One gram of the rubber modified resin is added to 25 ml of methyl ethyl ketone. The resulting suspension is sufficiently shaked and is centrifuged at 20,000 rpm at 0° C. to separate the suspension into a precipitate and a supernatant solution. The resulting supernatant solution contains the resin phase. The resin phase is recovered from the supernatant solution by means of precipitation with methanol. The precipitate obtained by centrifugation is recovered as the elastomeric rubber phase. The term "grafting degree" as used in the present invention is defined by the following formula:

$$G = \frac{A - R}{R} \times 100$$

wherein G represents the grafting degree, % by weight; R the amount of rubber contained in one gram of the rubber modified resin, gram; and A the amount of the elastomeric rubber phase contained in one gram of the rubber modified resin, gram. The content of the vinyl cyanide compound in each of the resin phase and elastomeric rubber phase is determined by the elementary analysis method.

When the graft phase comprises two classes of copolymers, namely a copolymer containing a vinyl cyanide compound in an amount of 3 to 15% by weight based on the copolymer and a copolymer containing a vinyl cyanide compound in an amount of 16 to 40% by weight based on the copolymer, fractionation of the graft phase is carried out as follows. The graft phase is recovered from the above-separated elastomeric rubber phase by the method known as "oxidation destruction method of rubber". In this method, the rubber of the elastomeric rubber phase is decomposed using osmium tetraoxide and hydroperoxide. The fractionation of the recovered graft phase can be made by generally known various methods, for example, by the column fractionation method as described in "Polymer Sci., Polymer Physics Edition, Vol. 19, 1377(1981)". In the present invention, there is used the following convenient method for fractionation of the graft phase. The obtained graft phase is added to a mixed solvent of acetone and methanol. The resulting suspension is sufficiently shaked and, then, centrifuged to separate insoluble matters from the suspension. In this connection, the proportion of acetone to methanol of the mixed solvent is appropriately adjusted prior to the use for the fractionation of the graft phase. For example, a mixture of acetone and methanol (7/3 by volume) can be advantageously used for fractionation of the graft phase because a copolymer containing the vinyl cyanide compound in an amount of 15% or less by weight based on the copolymer is insoluble in the mixed solvent while a copolymer containing the vinyl cyanide compound in an amount of 16% or more by weight based on the copolymer is soluble in the mixed solvent. After the fractionation, the content of the vinyl cyanide compound in each of the separated copolymers is determined by the elementary analysis method.

The grafting degree of the elastomeric rubber phase and the vinyl cyanide compound content of each of the resin phase and graft phase may be determined either by analyzing the rubber modified resin prior to the blending of the rubber modified resin with the polyphenylene ether resin or by analyzing the prepared polyphenylene ether resin composition bacause there is no difference in the data obtained between these two cases.

The polyphenylene ether resin composition of the present invention may additionally contain high impact polystyrenes, various styrene-butadiene block copolymers in an appropriate amount as far as the excellent solvent resistance and colorability characteristic of the polyphenylene ether resin composition of the present invention are not spoiled.

Further, other additives known to those skilled in the art may be present in the polyphenylene ether resin composition of the present invention such as plasticizers; stabilizers; ultraviolet absorbers; flame retardants; colorants; mold release agents; fibrous reinforcing agent such as glass fibers and carbon fibers; and fillers such as glass bead, calcium carbonate and talc. As preferred examples of the plasticizers, there may be mentioned polybutenes, low molecular weight polyethylenes, mineral oils, epoxidized soybean oils, polyethylene glycols, and fatty esters. As the stabilizers, there may be mentioned phosphites, hindered phenols, alkanol amines, acid amides, metal salts of dithiocarbamic acid, inorganic sulfides and metal oxides. They are used alone or in combination.

The method of forming the polyphenylene ether resin composition is not critical. That is, components (A) and (B) may be blended by generally known methods, for example, by means of extruder, heated roll, Bunbury mixer, Kneader and the like.

The following Examples illustrate the present invention in more detail but should not be construed as limiting the scope of the invention.

All parts used herein are by weight unless otherwise specified.

The properties shown herein are measured according to the following methods.

Falling Weight Impact Strength

Measurement was done substantially in accordance with ASTM D1709-75 (Reapproved 1980) except that as follows. Specimens: 150 mm×150 mm×2 mm flat plates formed by injection molding of the composition at 290° C. Test method: A semispheric missile having a radius of ½ in. and having a certain weight is allowed to drop from a height of 150 cm onto the middle of a specimen. When the specimen fails, the missile weight is decreased by 100 grams and is allowed to drop from the same height as mentioned above onto another specimen. When the specimen does not fail, the missile weight is increased by 100 grams and is allowed to drop from the same height as mentioned above onto the specimen. The above-mentioned tests are repeated to determine the missile weight which would result in 50% failure of specimens tested. The falling weight impact strength is calculated by the following equation:

$$I(kg \cdot cm) = 150(cm) \times W(gram)$$

wherein I represents the falling weight impact strength and W the missile weight which would result in 50% failure of specimens tested.

Solvent Resistance

A type-I dumbbell test piece according to ASTM D638 which has been formed by injection molding at 280° C. is immersed in cyclohexane at 23° C. for 24 hours and taken out of cyclohexane. After 10 minutes, the test piece is weighed. Solvent resistance is expressed by cyclohexane absorption calculated by the following equation:

$$\text{Cyclohexane absorption (wt \%)} = \frac{W_2 - W_1}{W_1} \times 100$$

wherein $W_1$ represents the weight of test piece before immersion, gram; and $W_2$ the weight of test piece after immersion, gram. Also, the test piece is examined with respect to occurence of cracking after immersion.

Colorability

Two groups of standard samples are prepared as follows. As one group of standard samples, black standard samples are prepared by adding various amounts of carbon black (particle diameter: 200 Å) as indicated below to 100 parts by weight of resin mixtures consisting of 40 parts by weight of poly(2,6-dimethyl-1,4-phenylene)ether having an intrinsic viscosity [η] of 0.62 (as measured at 30° C. in chloroform) and 60 parts by weight of a high impact polystyrene comprising 10% by weight of a polybutadiene rubber (weight mean particle diameter: 3.0 μ) and 90% by weight of a polystyrene and classified into ranks as indicated below.

As the other group of standard samples, white standard samples are prepared by adding various amounts of TiO₂ (particle diameter: 2000 Å) as indicated below to 100 parts by weight of resin mixtures consisting of 40 parts by weight of poly(2,6-dimethyl-1,4-phenylene)ether having an intrinsic viscosity [η] of 0.62 (as measured at 30° C. in chloroform) and 60 parts by weight of a high impact polystyrene comprising 10% by weight of a polybutadiene rubber (weight mean particle diameter: 3.0 μ) and 90% by weight of a polystyrene and classified into ranks as indicated below.

A black sample for estimation of colorability is prepared by adding 0.5 part by weight of carbon black (particle diameter: 200 Å) to 100 parts by weight of a polyphenylene ether resin composition. A white sample for estimation of colorability is prepared by adding 3 parts by weight of TiO₂ (particle diameter: 2000 Å) to 100 parts by weight of a polyphenylene ether resin composition. Colorability is determined by the method in which the black sample and white sample are compared with the black standard samples and white standard samples, respectively and what ranks of black and white standard samples respectively corresponds to the black and white samples are visually determined.

| Standard Samples | | | |
|---|---|---|---|
| (1) Black | | | |
| Amount of carbon black added (part by weight) | 0.5 | 0.75 | 1.0 |
| Colorability rank | C | B | A |
| (2) White | | | |
| Amount of TiO₂ added (parts by weight) | 3 | 5 | 7 |
| Colorability rank | C | B | A |

Production of a Rubber Modified Resin

A representative method of producing a rubber modified resin will be described below.

(1) Preparation of a Grafted Rubber Latex

40 Parts by weight (on the solid basis) of a polybutadiene latex havig a weight mean particle diameter of 4500 Å and 100 parts by weight of water were charged into a reactor and heated to 70° C. in an atmosphere of gaseous nitrogen while stirring. Then, a monomer phase containing 12 parts by weight of acrylonitrile, 48 parts by weight of styrene and 0.1 part by weight of dodecyl mercaptan and a solution prepared by dissolving 0.2 part by weight of potassium persulfate in 50 parts by weight of water were separately, simultaneously added to the polybutadiene latex over 5 hours. After completion of the addition, the reactor was further kept at 70°

C. for 2 hours to complete polymerization. The conversion of monomers was 95%.

(2) Preparation of a Diluting Resin Latex

120 Parts by weight of water and 1.0 part by weight of potassium rosinate for disproportionation were charged into a reactor and heated to 70° C. in an atmosphere of gaseous nitrogen while stirring. Then, a monomer phase containing 4 parts by weight of acrylonitrile, 96 parts by weight of styrene and 0.3 part by weight of dodecyl mercaptan and a solution prepared by dissolving 0.2 part by weight of potassium persulfate in 50 parts by weight of water were separately, simultaneously added over 7 hours. After completion of the addition, the reactor was further kept at 70° C. for 2 hours to complete polymerization. The conversion of monomers was 94%.

(3) Preparation of a Rubber Modified Resin

50 Parts by weight (on the solid basis) of the above-prepared grafted rubber latex and 50 parts by weight (on the solid basis) of the above-prepared diluting resin latex were sufficiently mixed and dispersed each other. The resulting latex was subjected to coagulation by adding 2.0 parts by weight of aluminum sulfate, followed by filtration. The resulting cake was washed with water and dried to obtain a rubber modified resin.

The obtained rubber modified resin was fractionated according to the above-mentioned method and analyzed. The results are as follows.

| | |
|---|---|
| Grafting degree | 74% by weight |
| Acrylonitrile content of graft phase | 20% by weight |
| Acrylonitrile content of resin phase | 7% by weight |

Adjusting of Grafting Degree and the Content of Vinyl Cyanide Compound

In preparation of a grafted rubber, the grafting degree is usually adjusted by changing the amount of dodecyl mercaptan to be added. The larger the amount of dodecyl mercaptan to be added, the lower the grafting degree. The grafting degree can also be adjusted by changing the amount ratio of rubber to monomers in polymerization or the period of time in which a monomer phase and an aqueous potassium persulfate solution are added to the reactor. The vinyl cyanide compound content of the graft phase is adjusted by changing the amount of the vinyl cyanide compound to be added in preparation of a grafted rubber. The vinyl cyanide content of the resin phase is adjusted by changing the amount of the vinyl cyanide compound to be added in preparation of a diluting resin, the ratio of a grafted rubber to a diluting resin and the like.

In the following Examples and Comparative Examples, the grafting degree and the vinyl cyanide compound content of each of the graft phase and resin phase of the rubber modified resin were adjusted as mentioned above.

EXAMPLES 1 AND COMPARATIVE EXAMPLES 1 AND 2

First, rubber modified resins Nos. 1 to 3 shown in Table 1 were prepared in substantially the same manner as described above with respect to the representative method of producing a rubber modified resin except that adjustments of the grafting degree of the elastomeric rubber phase and the acrylonitrile content of each of the resin phase and graft phase were carried out in the above-mentioned manner "Adjustment of grafting degree and the content of vinyl cyanide compound".

A polyphenylene ether resin composition was obtained by blending, by means of a blender, 40 parts by weight of poly(2,6-dimethyl-1,4-phenylene)ether having an intrinsic viscosity [$\eta$] of 0.62 (as measured at 30° C. in chloroform), 60 parts by weight of a rubber modified resin No. 1 consisting of a graft phase and a resin phase both shown in Table 1 and containing 20% by weight of rubber, 0.5 part by weight of Sumilizer BHT (trade name of hindered phenol manufactured and sold by Sumitomo Chemical Co. Ltd., Japan) as a stabilizer and 0.5 part by weight of MARK PEP-8 (trade name of distearyl pentaerythritol diphosphite manufactured and sold by ADEKA ARGUS Chemical Co., Ltd., Japan).

For comparison, a comparative polyphenylene ether resin composition was obtained in the same manner as mentioned above except that a rubber modified resin No. 2 consisting of a graft phase and a resin phase both shown in Table 1 and containing 20% by weight of rubber was used instead of the above-mentioned rubber modified resin No. 1.

Another comparative polyphenylene ether resin composition was obtained in the same manner as described above except that a rubber modified resin No. 3 consisting of a graft phase and a resin phase both shown in Table 1 and containing 20% by weight of rubber was used instead of the above-mentioned rubber modified resin No. 1 or No. 2.

The above-obtained compositions were pelletized by means of an extruder at 300° C.

TABLE 1

| Rubber modified resin No. | 1 | 2 | 3 |
|---|---|---|---|
| Composition | | | |
| Rubber content (% by weight) | 20 | 20 | 20 |
| AN* content (% by weight) | 7 | 0 | 11 |
| ST* content (% by weight) | 73 | 80 | 69 |
| Graft phase | | | |
| AN* content (% by weight) | 19 | 0 | 32 |
| Grafting degree (% by weight) | 74 | 69 | 77 |
| Resin phase AN* content (% by weight) | 7 | 0 | 9 |

Falling weight impact strength, solvent resistance and colorability of the above-obtained samples were measured. The results are shown in Table 2.

TABLE 2

|  | Example 1 | Comparative Example 1 | Comparative Example 2 |
|---|---|---|---|
| Composition (part by weight) | | | |
| Poly(2,6-dimethyl-1,4-phenylene)ether | 40 | 40 | 40 |
| Rubber modified resin No. | | | |
| 1 | 60 | — | — |
| 2 | — | 60 | — |
| 3 | — | — | 60 |
| Sumilizer BHT | 0.5 | 0.5 | 0.5 |
| MARK PEP-8 | 0.5 | 0.5 | 0.5 |
| Properties | | | |
| Falling weight impact strength (Kg · cm) | 350 | 600 | 80 |
| Solvent resistance (Cyclohexane absorption) (% by weight) | 0.07 | 0.27 | 0.05 |
| Colorability (rank) | | | |
| black | A | C | B |
| white | A | C | B |

As seen from the results shown in Table 2, the composition of Comparative Example 1 not containing acrylonitrile has a cyclohexane absorption as large as 0.27% by weight. Further, many cracks were observed on the surface of the immersed dumbbell test piece of Comparative Example 1. In the case where the cyclohexane absorption is 0.07% by weight or less (Examples 1 and Comparative Example 2), any cracks were not observed. The composition of Comparative Example 2 having AN content of the graft phase as large as 32% by weight is very poor in falling weight impact strength. On the other hand, the composition of Example 1 is excellent in falling weight impact strength, solvent resistance and colorability.

COMPARATIVE EXAMPLE 3

A rubber modified resin was prepared as follows. 20 Parts by weight (on the solid basis) of a polybutadiene latex having a weight mean particle diameter of 4500 Å and 100 parts by weight of water were charged into a reactor and heated to 70° C. in an atmosphere of gaseous nitrogen while stirring. Then, a monomer phase containing 4 parts by weight of acrylonitrile, 76 parts by weight of styrene and 0.1 part by weight of dodecyl mercaptan and a solution prepared by dissolving 0.3 part by weight of potassium persulfate in 50 parts by weight of water were separately, simultaneously added to the polybutadiene latex over 7 hours. After completion of the addition, the reactor was further kept at 70° C. for 2 hours to complete polymerization. The conversion of monomers was 95%.

The resulting polymer latex was subjected to coagulation by adding 2.0 parts by weight of aluminum sulfate, followed by filtration. The resulting cake was washed with water and dried to obtain a rubber modified resin (rubber content, 20% by weight; AN content, 4% by weight; ST content, 76% by weight).

The obtained rubber modified resin was analyzed according to the above-mentioned method. The results are as follows.

| Grafting degree | 71% by weight |
|---|---|
| AN content of graft phase | 5% by weight |
| AN content of resin phase | 5% by weight |

A polyphenylene ether resin composition was obtained in the same manner as in Example 1 except that 60 parts by weight of the above-obtained rubber modified resin was used. The thus prepared composition was pelletized by means of an extruder at 300° C.

Falling weight impact strength, solvent resistance and colorability of the above-obtained sample were measured. The results are as follows.

| Falling weight impact strength | 600 kg · cm |
|---|---|
| Solvent resistance (Cyclohexane absorption) | 0.10% by weight |
| Colorability (rank) | |
| black | B |
| white | B |

EXAMPLES 2 AND 3 AND COMPARATIVE EXAMPLE 4

First, rubber modified resins Nos. 4 to 6 shown in Table 3 were prepared in substantially the same manner as described above with respect to the representative method of producing a rubber modified resin except that adjustments of the grafting degree of the elastomeric rubber phase, and the acrylonitrile moiety content of each of the resin phase and graft phase were carried out in the above-mentioned manner "Adjustment of grafting degree and the content of vinyl cyanide compound".

A polyphenylene ether resin composition was obtained by blending, 40 parts by weight of poly(2,6-dimethyl-1,4-phenylene) ether having an intrinsic viscosity [η] of 0.62 (as measured at 30° C. in chloroform), 60 parts by weight of a rubber modified resin No. 4 consisting of a graft phase and a resin phase both shown in Table 3 and containing 25% by weight of rubber, 0.5 part by weight of Sumilizer BHT (trade name of hindered phenol manufactured and sold by Sumitomo Chemical Co. Ltd., Japan) as a stabilizer and 0.5 part by weight of MARK PEP-8 (trade name of distearyl pentaerythritol diphosphite manufactured and sold by ADEKA ARGUS Chemical Co. Ltd., Japan).

Another polyphenylene ether resin composition was obtained in the same manner as described above except that a rubber modified resin No. 5 consisting of a graft phase and a resin phase both shown in Table 3 and containing 25% by weight of rubber was used instead of the above-metnioned rubber modified resin No. 4.

Still another polyphenylene ether resin composition was obtained in the same manner as described above except that a rubber modified resin No. 6 consisting of a graft phase and a resin phase both shown in Table 3 and containing 25% by weight of rubber was used instead of the above-mentioned rubber modified resin No. 4 or 5.

The above-obtained compositions were pelletized by means of an extruder at 300° C.

TABLE 3

| Rubber modified resin No. | 4 | 5 | 6 |
|---|---|---|---|
| Composition | | | |
| Rubber content (% by weight) | 25 | 25 | 25 |
| AN content (% by weight) | 6 | 7 | 8 |
| ST content (% by weight) | 69 | 68 | 67 |
| Graft Phase | | | |
| AN content (% by weight) | 15 | 15 | 15 |
| Grafting degree (% by weight) | 32 | 64 | 115 |
| Resin Phase AN content (% by weight) | 7 | 7 | 7 |

Falling weight impact strength, solvent resistance and colorability of the above-mentioned samples were measured. The results are shown in Table 4.

TABLE 4

| | Comparative Example 4 | Example 2 | Example 3 |
|---|---|---|---|
| Composition (part by weight) | | | |
| Poly(2,6-dimethyl-1,4-phenylene)ether | 40 | 40 | 40 |
| Rubber modified resin No. | | | |
| 4 | 60 | — | — |
| 5 | — | 60 | — |
| 6 | — | — | 60 |
| Sumilizer BHT | 0.5 | 0.5 | 0.5 |
| MARK PEP-8 | 0.5 | 0.5 | 0.5 |
| Properties | | | |
| Falling weight impact strength (kg · cm) | 250 | 650 | 700 |
| Solvent resistance (Cyclohexane absorption) (% by weight) | 0.14 | 0.08 | 0.07 |
| Colorability (rank) | | | |
| black | C | B | A |
| white | B | A | A |

As seen from Tables 3 and 4, the higher the grafting degree, the better is falling weight impact strength, solvent resistance and colorability.

EXAMPLES 4 AND 5 AND COMPARATIVE EXAMPLE 5

First, rubber modified resins Nos. 7 to 9 shown in Table 5 were prepared in substantially the same manner as described above with respect to the representative method of producing a rubber modified resin except that adjustments of the grafting degree of the elastomeric rubber phase, and the acrylonitrile content of each of the resin phase and graft phase were carried out in the above-mentioned manner "Adjustment of grafting degree and the content of vinyl cyanide compound".

A polphenylene ether resin composition was obtained by blending 50 parts by weight of poly(2,6-dimethyl-1,4-phenylene)ether having an intrinsic viscosity [η] of 0.66 (as measured at 30° C. in chloroform), 50 parts by weight of a rubber modified resin No. 7 consisting of a graft phase and a resin phase both shown in Table 5 and containing 25% by weight of rubber, 0.5 part by weight of Sumilizer BHT (trade name of hindered phenol manufactured and sold by Sumitomo Chemical Co. Ltd., Japan) as a stabilizer and 0.5 part by weight of MARK PEP-8 (trade name of distearyl pentaerythritol diphosphite manufactured and sold by ADEKA ARGUS Chemical Co. Ltd., Japan).

Another polyphenylene ether resin composition was obtained in the same manner as described above except that a rubber modified resin No. 8 consisting of a graft phase and a resin phase both shown in Table 5 and containing 25% by weight of rubber was used instead of the above-mentioned rubber modified resin No. 7.

For comparison, a comparative polyphenylene ether resin composition was obtained in the same manner as described above except that a rubber modified resin No. 9 consisting of a graft phase and a resin phase both shown in Table 5 and containing 25% by weight of rubber was used instead of the above-mentioned rubber modified resin No. 7 or 8.

The above-obtained compositions were pelletized by means of an extruder at 300° C.

TABLE 5

| Rubber modified resin No. | 7 | 8 | 9 |
|---|---|---|---|
| Composition | | | |
| Rubber content (% by weight) | 25 | 25 | 25 |
| AN content (% by weight) | 6 | 8 | 11 |
| ST content (% by weight) | 69 | 67 | 64 |
| Graft phase | | | |
| AN content (% by weight) | 15 | 15 | 15 |
| Grafting degree (% by weight) | 75 | 75 | 75 |
| Resin phase AN content (% by weight) | 5 | 10 | 15 |

Falling weight impact strength, solvent resistance and colorability of the above-mentioned samples were measured. The results are shown in Table 6.

TABLE 6

| | Example 4 | Example 5 | Comparative Example 5 |
|---|---|---|---|
| Composition (part by weight) | | | |
| Poly(2,6-dimethyl-1,4-phenylene)ether | 50 | 50 | 50 |
| Rubber modified resin No. | | | |
| 7 | 50 | — | — |
| 8 | — | 50 | — |
| 9 | — | — | 50 |
| Sumilizer BHT | 0.5 | 0.5 | 0.5 |
| MARK PEP-8 | 0.5 | 0.5 | 0.5 |
| Properties | | | |
| Falling weight impact strength (kg · cm) | 650 | 450 | 40 |
| Solvent resistance (Cyclohexane | 0.08 | 0.06 | 0.05 |

TABLE 6-continued

|  | Example 4 | Example 5 | Comparative Example 5 |
|---|---|---|---|
| absorption) (% by weight) | | | |
| Colorability (rank) | | | |
| black | B | B | B |
| white | A | A | B |

As seen from Tables 5 and 6, the composition of Comparative Example 5 having an AN content of resin phase of as large as 15% by weight is very poor in falling weight impact strength and is very brittle as compared with the compositions of Examples 4 and 5.

EXAMPLE 6

A rubber modified resin comprising 20% by weight of a rubber, 7% by weight of acrylonitrile and 73% by weight of a mixture of styrene and α-methylstyrene was prepared in substantially the same manner as described with respect to the representative method of producing a rubber modified resin except that a mixture consisting of 57% by weight of styrene and 43% by weight of α-methylstyrene was used instead of styrene in the preparation of a grafted rubber and a diluting resin and that the adjustments of the grafting degree and AN content of each of the resin phase and graft phase were carried out in the above-mentioned manner "Adjustment of grafting degree and the content of vinyl cyanide compound".

| Rubber modified resin | |
|---|---|
| Grafting degree | 62% by weight |
| AN content of graft phase | 20% by weight |
| AN content of resin phase | 7% by weight |

A polyphenylene ether resin composition was obtained in the same manner as described in Example 1 and Comparative Examples 1 and 2 except that the rubber modified resin as obtained above was used instead of the rubber modified resin No. 1, 2 or 3.

The above-obtained composition was plelletized by means of an extruder at 300° C.

Falling weight impact strength, solvent resistance and colorability of the above-obtained sample were measured. The results are as follows.

| Falling weight impact strength | 400 kg · cm |
|---|---|
| Solvent resistance (Cyclohexane absorption) | 0.08% by weight |
| Colorability (rank) black | B |
| white | B |

EXAMPLE 7

A polyphenylene ether resin composition was obtained by blending 40 parts by weight of a copolymer consisting of 90% by mole of 2,6-dimethylphenol and 10% by mole of 2,3,6-trimethylphenol and having an intrinsic viscosity [η] of 0.65 (as measured at 30° C. in chloroform), 60 parts by weight of a rubber modified resin No. 5 as mentioned in Examples 2 and 3 and Comparative Example 4, 0.5 part by weight of Sumilizer BHT (trade name of hindered phenol manufactured and sold by Sumitomo Chemical Co. Ltd., Japan) as a stabilizer and 0.5 part by weight of MARK PEP-8 (trade name of distearyl pentaerythritol diphosphite manufactured and sold by ADEKA ARGUS Chemical Co., Ltd., Japan).

The obtained composition was pelletized by means of an extruder at 300° C.

Falling weight impact strength, solvent resistance and colorability of the obtained sample were measured. The results are as follows.

| Falling weight impact strength | 580 kg · cm |
|---|---|
| Solvent resistance (Cyclohexane absorption) | 0.08% by weight |
| Colorability (rank) black | B |
| white | A |

EXAMPLE 8

A rubber modified resin comprising 20% by weight of a rubber, 6% by weight of methacrylonitrile and 74% by weight of styrene was prepared in substantially the same manner as described with respect to the representative method of producing a rubber modified resin except that methacrylonitrile was used instead of acrylonitrile in the preparation of a grafted rubber and a diluting resin and that the adjustments of the grafting degree and the methacrylonitrile moiety content of the graft phase and resin phase were carried out in the above-mentioned manner "Adjustment of grafting degree and content of vinyl cyanide compound moiety".

| Rubber modified resin | |
|---|---|
| Grafting degree | 54% by weight |
| Methacrylonitrile content of graft phase | 20% by weight |
| Methacrylonitrile content of resin phase | 5% by weight |

A polyphenylene ether resin composition was obtained in the same manner as described in Example 1 and Comparative Examples 1 and 2 except that the rubber modified resin as obtained above was used instead of the rubber modified resin No. 1, 2 or 3.

The above-obtained composition was pelletized by means of an extruder at 300° C.

Falling weight impact strength, solvent resistance and colorability of the above-obtained sample were measured. The results are as follows.

| Falling weight impact strength | 300 kg · cm |
|---|---|
| Solvent resistance (Cyclohexane absorption) | 0.09% by weight |
| Colorability (rank) black | B |
| white | B |

The conditions for preparing rubber modified resin employed in Examples 1 to 8 and Comparative Examples 1 to 5 as described before will be summarized in Table 7.

TABLE 7

| Example No. | Rubber Kind | Rubber Amount (part) | Vinyl cyanide compound Kind | Vinyl cyanide compound Amount (part) | Vinyl aromatic compound Kind | Vinyl aromatic compound Amount (part) | Dodecyl mercaptan Amount (part) | Addition of monomer phase to reactor (hrs) |
|---|---|---|---|---|---|---|---|---|
| Ex. 1 | Polybutadiene | 40 | Acrylonitrile | 11.4 | Styrene | 48.6 | 0.1 | 5 |
| Comparative Ex. 1 | Polybutadiene | 20 | None | — | " | 80 | 0.1 | 8 |
| Comparative Ex. 2 | Polybutadiene | 40 | Acrylonitrile | 19 | " | 41 | 0.2 | 4 |
| Comparative Ex. 3 | Polybutadiene | 20 | Acrylonitrile | 4 | " | 76 | 0.1 | 7 |
| Comparative Ex. 4 | Polybutadiene | 60 | Acrylonitrile | 6 | " | 34 | 0.3 | 3 |
| Ex. 2 | Polybutadiene | 50 | Acrylonitrile | 7.5 | " | 42.5 | 0.1 | 5 |
| Ex. 3 | Polybutadiene | 40 | Acrylonitrile | 9 | " | 51 | 0.05 | 6 |
| Ex. 4 | Polybutadiene | " | Acrylonitrile | " | " | " | 0.1 | " |
| Ex. 5 | Polybutadiene | " | Acrylonitrile | " | " | " | " | " |
| Comparative Ex. 5 | Polybutadiene | " | Acrylonitrile | " | " | " | " | " |
| Ex. 6 | Polybutadiene | " | Acrylonitrile | 12 | A mixture of styrene and α-methylstyrene | 48 | " | 5 |
| Ex. 7 | Polybutadiene | 50 | Acrylonitrile | 7.5 | Styrene | 42.5 | " | " |
| Ex. 8 | Polybutadiene | " | Methacrylonitrile | 10 | " | 40 | " | 4 |

| Example No. | Potassium persulfate Amount (part) | Potassium persulfate Addition to reactor (hrs) | Diluting resin Vinyl cyanide compound Kind | Diluting resin Vinyl cyanide compound Amount (part) | Diluting resin Vinyl aromatic compound Kind | Diluting resin Vinyl aromatic compound Amount (part) | Grafted rubber (part)/ diluting resin (part) |
|---|---|---|---|---|---|---|---|
| Ex. 1 | 0.2 | 5 | Acrylonitrile | 4 | Styrene | 96 | 50/50 |
| Comparative Ex. 1 | 0.4 | 8 | None | — | None | — | 100/0 |
| Comparative Ex. 2 | 0.2 | 4 | Acrylonitrile | 2 | Styrene | 98 | 50/50 |
| Comparative Ex. 3 | 0.3 | 7 | None | — | None | — | 100/0 |
| Comparative Ex. 4 | 0.2 | 3 | Acrylonitrile | 6 | Styrene | 94 | 40/60 |
| Ex. 2 | " | 5 | Acrylonitrile | " | " | " | 50/50 |
| Ex. 3 | 0.4 | 6 | Acrylonitrile | " | " | " | 60/40 |
| Ex. 4 | 0.2 | " | None | — | " | 100 | " |
| Ex. 5 | " | " | Acrylonitrile | 8 | " | 92 | " |
| Comparative Ex. 5 | " | " | Acrylonitrile | 15 | " | 85 | " |
| Ex. 6 | " | 5 | Acrylonitrile | 4 | A mixture of styrene and α-methylstyrene | 96 | 50/50 |
| Ex. 7 | " | " | Acrylonitrile | 6 | Styrene | 94 | " |
| Ex. 8 | 0.3 | 4 | Meth- | 3 | " | 97 | 40/60 |

TABLE 7-continued

|  |
|---|
| acrylonitrile |

EXAMPLE 9

A rubber modified resin having a high grafting degree was prepared by the bulk polymerization method as will be described below.

75 Parts by weight of styrene, 10 parts by weight of acrylonitrile, 15 parts by weight of a polybutadiene rubber, 0.1 part by weight of benzoyl peroxide and 20 parts by weight of ethylbenzene were charged into a reactor. The resulting mixture was kept, while stirring, at 80° C. for 5 hours, 130° C. for 3 hours and 150° C. for 3 hours for polymerization reaction. The conversion of monomers was 90%. After completion of the polymerization reaction, the reaction mixture was allowed to stand at 230° C. under a reduced pressure (5 mmHg) for 30 minutes to remove ethylbenzene and unpolymerized monomers. Thus, a grafted rubber was obtained.

A diluting resin latex was prepared in the same manner as in Examples 2 and 3 and Comparative Example 4. 100 Parts by weight (on the solid basis) of the above-prepared diluting resin latex was subjected to coagulation by adding 2.0 parts by weight of aluminum sulfate, followed by filtration. The resulting cake was washed with water and dried to obtain a diluting resin.

70 Parts by weight of the above-prepared grafted rubber and 30 parts by weight of the above-prepared diluting resin and 0.2 part by weight of Sumilizer BHT as a stabilizer were blended and extruded by means of an extruder at 230° C. to obtain a rubber modified resin in a pelletized form.

The thus prepared rubber modified resin was analyzed according to the above-mentioned analytical method. The results are as follows.

| Rubber modified resin | |
|---|---|
| Rubber content | 12% by weight |
| AN content | 9% by weight |
| ST content | 79% by weight |
| Grafting degree | 266% by weight |
| AN content of graft phase | 12% by weight |
| AN content of resin phase | 9% by weight |

A polyphenylene ether resin composition was obtained in the same manner as in Example 1 except that 60 parts by weight of the above-prepared rubber modified resin was used. The above-obtained composition was pelletized by means of an extruder at 300° C.

Falling weight impact strength, solvent resistance and colorability of the above-obtained sample were measured. The results are as follows.

| Falling weight impact strength | 400 kg · cm | |
|---|---|---|
| Solvent resistance (Cyclohexane absorption) | 0.06% by weight | |
| Colorability (rank) | black | B |
|  | white | A |

EXAMPLE 10 AND COMPARATIVE EXAMPLE 6

A rubber modified resin of which the graft phase comprises two classes of copolymers was prepared as follows.

40 Parts by weight of polybutadiene latex having a weight average particle diameter of 3500 Å and 100 parts by weight of water were put into a reaction vessel and heated to 70° C. in an atmosphere of gaseous nitrogen while stirring. Then, a first monomer phase containing 9 parts by weight of acrylonitrile, 21 parts by weight of styrene and 0.1 part by weight of dodecyl mercaptan and an aqueous solution prepared by dissolving 0.1 part by weight of potassium persulfate in 50 parts by weight of water were separately, simultaneously introduced into the reactor over 3 hours. Subsequently, a second monomer phase containing 30 parts by weight of styrene and 0.1 part by weight of dodecyl mercaptan and an aqueous solution prepared by dissolving 0.1 part by weight of potassium persulfate in 50 parts by weight of water were separately, simultaneously introduced into the reactor over 3 hours. After completion of the introduction, the mixture was further maintained at a temperature of 70° C. for 2 hours to complete polymerization. The conversion of monomers was 93%.

The thus prepared rubber modified resin was analyzed according to the above-mentioned analytical method. The results are as follows.

| Rubber content | 42% by weight |
|---|---|
| AN content | 9% by weight |
| ST content | 49% by weight |
| Grafting degree | 70% by weight |
| AN content of resin phase | 9% by weight |

The AN content of each of two classes of copolymers constituting the graft phase was determined as follows.

The rubber of the elastomeric rubber phase was decomposed using osmium tetraoxide and hydroperoxide to recover the graft phase. 1 g of the obtained graft phase was added to 25 ml of a mixed solvent of acetone and methanol (7/3 by volume) and dispersed into the mixed solvent while shaking, whereby part of the graft phase was transferred to the mixed solvent phase. The resulting dispersion was centrifuged to recover the mixed solvent containing part of the graft phase from the dispersion. The AN content of each of a graft phase soluble in the mixed solvent and a graft phase insoluble in the mixed solvent was determined. The results are as follows.

| Graft phase insoluble in the mixed solvent of acetone and methanol (7/3 by volume): | |
|---|---|
| Amount | 38% by weight |
| AN content | 6% by weight |
| Graft phase soluble in | |

-continued

| | |
|---|---|
| the mixed solvent of acetone and methanol (7/3 by volume): | |
| Amount | 62% by weight |
| AN content | 29% by weight |

For comparison, a conventionally known ABS resin (acrylonitrile-butadiene-styrene resin) was prepared by the emulsion graft polymerization method as will be described below.

40 Parts by weight of a polybutadiene rubber and 100 parts by weight of water were charged into a reactor and heated to 70° C. Then, a monomer phase containing 18 parts by weight of acrylonitrile, 42 parts by weight of styrene and 0.2 part by weight of dodecyl mercaptan and a solution prepared by dissolving 0.2 part by weight of potassium persulfate in 50 parts by weight of water were separately, simultaneously introduced into the reactor over 5 hours. After completion of the introduction, the reactor was further kept at 70° C. for 2 hours to complete polymerization. The conversion of monomers was 93%. The resulting ABS resin latex was subjected to coagulation by adding 2.0 parts by weight of aluminum sulfate, followed by filtration. The resulting cake was washed with water and dried to obtain an ABS resin. With respect to the resulting ABS resin, the grafting degree of the elastomeric rubber phase, the AN content of each of the graft phase and resin phase were determined in the same manner as mentioned above. The results are as follows.

| | |
|---|---|
| Rubber content | 42% by weight |
| AN content | 17% by weight |
| ST content | 41% by weight |
| Grafting degree | 60% by weight |
| AN content of resin phase | 29% by weight |
| Graft phase insoluble in the mixture of acetone and methanol (7/3 by volume): | |
| Amount | not more than 1% by weight |
| AN content | impossible to measure because of extremely small amount of the graft phase |
| Graft phase soluble in the mixture of acetone and methanol (7/3 by volume): | |
| Amount | not less than 99% by weight |
| An content | 28% by weight |

Subsequently, to 50 parts by weight of poly(2,6-dimethyl-1,4-phenylene)ether having an intrinsic viscosity [η] of 0.62 (in chloroform at 30° C.) were added 50 parts by weight of the above-prepared rubber modified resin of which the graft phase comprises two classes of copolymers and 0.5 part by weight of each of Sumilizer BHT as a stabilizer and Mark PEP-8, followed by blending using a blender to form a polyphenylene ether resin composition. Then, the resulting composition was extruded at 300° C. to pelletize.

For comparison, a comparative composition was prepared in the same manner as mentioned above except that the above-prepared ABS resin was used instead of the rubber modified-resin. The resulting comparative composition was pelletized in the same manner as mentioned above.

With respect to each of the above-prepared compositions, properties were determined.

The results are shown below.

TABLE 8

| | Example 10 | Comparative Example 6 |
|---|---|---|
| Falling weight impact strength (kg · cm) | 900 | 30 |
| Cyclohexane absorption (% by weight) | 0.06 | 0.05 |
| Colorability (rank) | | |
| black | B | C |
| white | B | C |

As is apparent from Table 8, the composition containing the rubber modified resin of which the graft phase comprises two classes of copolymers is excellent in impact strength, solvent resistance and colorability, particularly excellent in impact strength and cololability. Whereas, the composition containing the conventionally known ABS resin is poor in both of impact strength and colorability.

EXAMPLE 11 AND COMPARATIVE EXAMPLE 7

A polyphenylene ether resin composition was prepared in the same manner as in Example 10 except that the polyphenylene ether was used in an amount of 40 parts by weight instead of 50 parts by weight, that the rubber modified resin was used in an amount of 40 parts by weight instead of 50 parts by weight and that 20 parts by weight of a polystyrene was additionally used. The resulting composition was pelletized in the same manner as in Example 10 to determine the properties of the composition.

For comparison, a comparative composition was prepared and pelletized in the same manner as described above except that the ABS resin as prepared in Comparative Example 6 was used instead of the rubber modified resin.

The properties of each of the compositions were determined and the results are shown below.

TABLE 9

| | Example 11 | Comparative Example 7 |
|---|---|---|
| Falling weight impact strength (kg · cm) | 850 | 20 |
| Cyclohexane absorption (% by weight) | 0.05 | 0.04 |
| Colorability (rank) | | |
| black | B | C |
| white | A | C |

As is apparent from Table 9, even when polystyrene is additionally blended together with polyphenylene ether and rubber modified resin to be used in the present invention, the resulting composition is very excellent in impact strength, solvent resistance and colorability.

EXAMPLE 12

A polyphenylene ether resin composition was prepared in the same manner as in Example 10 except that the polyphenylene ether was used in an amount of 40 parts by weight instead of 50 parts by weight, that the rubber modified resin was used in an amount of 30 parts by weight instead of 50 parts by weight and that 30 parts by weight of a copolymer containing styrene units and acrylonitrile units (acrylonitrile content: 4% by weight) was additionally used as a diluting resin. The resulting composition was pelletized in the same manner as in Example 10 to determine the properties of the composition. The results obtained are shown in Table 10.

TABLE 10

| | Example 12 |
|---|---|
| Falling weight impact strength (kg · cm) | 800 |
| Cyclohexane absorption (% by weight) | 0.06 |
| Colorability (rank) | |
| black | A |
| white | A |

As is apparent from the results, even when the styrene-acrylonitrile copolymer having an acrylonitrile moiety content of 4% by weight as a diluting resin is additionally blended so that the content of rubber moiety in the composition is lowered to 12% by weight based on the composition, the resulting composition has very high impact strength and is also excellent in solvent resistance and colorability.

EXAMPLE 13

A rubber modified resin comprising 42% by weight of a rubber, 7% by weight of acrylonitirle and 51% by weight of styrene was prepared in the same manner as described in Example 10 except that the following first and second monomer phases were used.

| The first monomer phase: | |
|---|---|
| Acryronitrile | 7.5 parts by weight |
| Styrene | 17.5 parts by weight |
| Dodecyl mercaptan | 0.1 part by weight |
| The second monomer phase: | |
| Styrene | 35 parts by weight |
| Dodecyl mercaptan | 0.1 part by weight |

The conversion of monomers was 91%. With respect to the obtained rubber modified resin, the grafting degree of the elastomeric rubber phase and the AN content of each of the graft phase and resin phase were determined. The results are as follows.

| Grafting degree | 62% by weight |
|---|---|
| AN content of resin phase | 7% by weight |
| Graft phase insoluble in the mixture of acetone and methanol (7/3 by volume): | |
| Amount | 54% by weight |
| AN content | 5% by weight |
| Graft phase soluble in the mixture of acetone and methanol (7/3 by volume): | |
| Amount | 46% by weight |
| AN content | 29% by weight |

A polyphenylene ether resin composition was prepared and pelletized in the same manner as described in Example 10 except that the above-obtained rubber modified resin was used. Properties of the obtained composition are shown below.

TABLE 11

| | Example 13 |
|---|---|
| Falling weight impact strength (kg · cm) | 900 |
| Cyclohexane absorption (% by weight) | 0.07 |
| Colorability (rank) | |
| black | B |
| white | B |

EXAMPLE 14

A rubber modified resin comprising 42% by weight of a rubber, 5% by weight of acrylonitirle and 53% by weight of styrene was prepared in the same manner as descirbed in Example 10 except that the following first and second monomer phases were used.

| The first monomer phase: | |
|---|---|
| Acryronitrile | 6.0 parts by weight |
| Styrene | 14.0 parts by weight |
| Dodecyl mercaptan | 0.1 part by weight |
| The second monomer phase: | |
| Styrene | 40 parts by weight |
| Dodecyl mercaptan | 0.2 part by weight |

The conversion of monomers was 92%. With respect to the obtained rubber modified resin, the grafting degree of the elastomeric rubber phase and the AN content of each of the graft phase and resin phase were determined. The results are as follows.

| Grafting degree | 35% by weight |
|---|---|
| AN content of resin phase | 6% by weight |
| Graft phase insoluble in the mixture of acetone and methanol (7/3 by volume): | |
| Amount | 67% by weight |
| AN content | 4% by weight |
| Graft phase soluble in the mixture of acetone and methanol (7/3 by volume): | |
| Amount | 33% by weight |
| AN content | 28% by weight |

A polyphenylene ether resin composition was prepared and pelletized in the same manner as described in Example 10 except that the above-obtained rubber modified resin was used. Properties of the obtained composition are shown below

TABLE 12

|  | Example 14 |
|---|---|
| Falling weight impact strength (kg · cm) | 800 |
| Cyclohexane absorption (% by weight) | 0.08 |
| Colorability (rank) | |
| black | B |
| white | B |

COMPARATIVE EXAMPLE 8

A rubber modified resin comprising 42% by weight of a rubber, 4% by weight of acrylonitirle and 54% by weight of styrene was prepared in the same manner as described in Example 10 except that the following first and second monomer phases were used.

| The first monomer phase: | |
|---|---|
| Acrylonitrile | 4.5 parts by weight |
| Styrene | 10.5 parts by weight |
| Dodecyl mercaptan | 0.05 part by weight |
| The second monomer phase: | |
| Styrene | 45 parts by weight |
| Dodecyl mercaptan | 0.1 part by weight |

The conversion of monomers was 90%.

With respect to the obtained rubber modified resin, the grafting degree of the elastomeric rubber phase and the AN content of each of the graft phase and resin phase were determined. The results are shown below.

| Grafting degree | 43% by weight |
|---|---|
| AN content of resin phase | 5% by weight |
| Graft phase insoluble in the mixture of acetone and methanol (7/3 by volume): | |
| Amount | 79% by weight |
| AN content | 4% by weight |
| Graft phase soluble in the mixture of acetone and methanol (7/3 by volume): | |
| Amount | 21% by weight |
| AN content | 27% by weight |

A polyphenylene ether resin composition was prepared and pelletized in the same manner as described in Example 10 except that the above-prepared rubber modified resin was used. Properties of the resulting composition are shown below.

TABLE 13

|  | Comparative Example 8 |
|---|---|
| Falling weight impact strength (kg · cm) | 650 |
| Cyclohexane absorption (% by weight) | 0.10 |
| Colorability (rank) | |
| black | C |
| white | B |

EXAMPLE 15

A rubber modified resin comprising 42% by weight of a rubber, 9% by weight of acrylonitrile and 49% by weight of styrene was prepared in the same manner as described in Example 10 except that the amount of dodecyl mercaptan in each of the first and second monomer phases was changed to 0.05 part by weight. The conversion of monomers was 92%.

With respect to the obtained rubber modified resin, the grafting degree of the elastomeric phase and the AN content of each of the graft phase and resin phase were determined. The results are as follows.

| Grafting degree | 98% by weight |
|---|---|
| AN content of resin phase | 8% by weight |
| Graft phase insoluble in the mixture of acetone and methanol (7/3 by volume): | |
| Amount | 43% by weight |
| AN content | 7% by weight |
| Graft phase soluble in the mixture of acetone and methanol (7/3 by volume): | |
| Amount | 57% by weight |
| AN content | 29% by weight |

A polyphenylene ether resin composition was prepared and pelletized in the same manner as described in Example 10 except that the above-prepared rubber modified resin was used. Properties of the composition are shown below.

TABLE 14

|  | Example 15 |
|---|---|
| Falling weight impact strength (kg · cm) | 1000 |
| Cyclohexane absorption (% by weight) | 0.06 |
| Colorability (rank) | |
| black | A |
| white | A |

What is claimed is:

1. A polyphenylene ether resin composition comprising:
   (A) 10 to 80% by weight of a polyphenylene ether resin, and
   (B) 90 to 20% by weight of a rubber modified resin, said rubber modified resin containing a discontinuous elastomeric rubber phase dispersed in a continuous resin phase comprising a copolymer of a vinyl cyanide compound and a vinyl aromatic compound or a mixture of a homopolymer of a vinyl aromatic compound and a copolymer of a vinyl cyanide compound and a vinyl aromatic compound, said elastomeric rubber phase comprising a grafted elastomeric rubber which has a graft phase of a vinyl cyanide compound copolymerized with a vinyl aromatic compound, said elastomeric rubber phase having a grafting degree of 35 to 300% by weight, said grafting degree being defined by the formula:

$$G = \frac{A - R}{R} \times 100$$

wherein G represents the grafting degree, % by weight; R the amount of rubber contained in one gram of the rubber modified resin, gram; and A the amount of the elastomeric rubber phase contained in one gram of the rubber modified resin, gram, said graft phase containing 12 to 30% by weight of the vinyl cyanide compound based on the total amount of the vinyl cyanide compound and the vinyl aromatic compound present in the graft phase, said continuous resin phase containing 3 to 10% by weight of the vinyl cyanide compound based on the amount of the continuous resin phase.

2. A composition according to claim 1, wherein said graft phase of the grafted elastomeric rubber phase comprises (a) a copolymer of a vinyl cyanide compound and a vinyl aromatic compound containing a vinyl cyanide compound in an amount of 3 to 15% by weight based on the copolymer and (b) a copolymer of a vinyl cyanide compound and a vinyl aromatic compound containing a vinyl cyanide compound in an amount of 16 to 40% by weight based on the copolymer, said copolymers (a) and (b) having a weight ratio (a)/(b) of 9/1 to 1/9, provided that the average content of vinyl cyanide compound is 12 to 30% by weight, based on the total amount of said copolymers (a) and (b) present in the graft phase.

3. A composition according to claim 1, wherein said vinyl aromatic compound is at least one monomer selected from the group of compounds represented by the following formula:

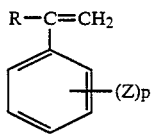

wherein R represents a hydrogen atom, a halogen atom or an alkyl group; Z a hydrogen atom, a halogen atom, a vinyl group or an alkyl group; and p an integer of 1 to 5.

4. A composition according to claim 2, wherein said vinyl aromatic compound is at least one monomer selected from the group of compounds represented by the following formula:

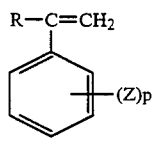

wherein R represents a hydrogen atom, a halogen atom or an alkyl group; Z a hydrogen atom, a halogen atom, a vinyl group or an alkyl group; and p an integer of 1 to 5.

5. A composition according to claim 1, wherein said polyphenylene ether resin is a homopolymer comprising a repeating structural unit represented by the formula(I) or a copolymer comprising a repeating structural unit represented by the formula(I) and a repeating structural unit represented by the formula(II):

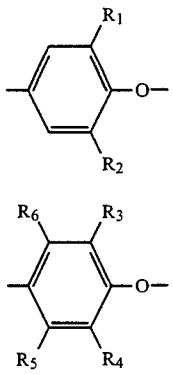

wherein $R_1$, $R_2$, $R_3$, $R_4$, $R_5$ and $R_6$ each independently represent a monovalent substituent selected from the group consisting of an alkyl group having 1 to 4 carbon atoms excluding a tert-butyl group; an aryl group; a halogen atom; and a hydrogen atom, provided that $R_5$ and $R_6$ do not simultaneously represent a hydrogen atom.

6. A composition according to claim 2, wherein said polyphenylene ether resin is a homopolymer comprising a repeating structural unit represented by the formula(I) or a copolymer comprising a repeating structural unit represented by the formula(I) and a repeating structural unit represented by the formula(II):

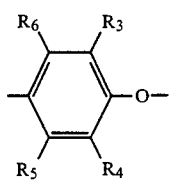

wherein $R_1$, $R_2$, $R_3$, $R_4$, $R_5$ and $R_6$ each independently represent a monovalent substituent selected from the group consisting of an alkyl group having 1 to 4 carbon atoms excluding a tert-butyl group; an aryl group; a halogen atom; and a hydrogen atom, provided that $R_5$ and $R_6$ do not simultaneously represent a hydrogen atom.

7. A composition according to claim 1, wherein said polyphenylene ether resin is poly(2,6-dimethyl-1,4-phenylene)ether.

8. A composition according to claim 2, wherein said polyphenylene ether resin is poly(2,6-dimethyl-1,4-phenylene)ether.

9. A composition according to claim 1, wherein said polyphenylene ether resin is a copolymer of 2,6-dimethylphenol and 2,3,6-trimethylphenol.

10. A composition according to claim 2, wherein said polyphenylene ether resin is a copolymer of 2,6-dimethylphenol and 2,3,6-trimethylphenol.

11. A composition according to claim 1, wherein said vinyl aromatic compound is at least one member selected from the group consisting of styrene, α-methylstyrene, vinyltoluene, vinylethylbenzene, vinylxylene, tert-butylxylene and chlorostyrene.

12. A composition according to claim 2, wherein said vinyl aromatic compound is at least one member selected from the group consisting of styrene, α-methylstyrene, vinyltoluene, vinylethylbenzene, vinylxylene, tert-butylxylene and chlorostyrene.

13. A composition according to claim 1, wherein said vinyl aromatic compound is styrene.

14. A composition according to claim 2, wherein said vinyl aromatic compound is styrene.

15. A composition according to claim 1, wherein said vinyl aromatic compound is a mixture of styrene and α-methylstyrene.

16. A composition according to claim 2, wherein said vinyl aromatic compound is a mixture of styrene and α-methylstyrene.

17. A composition according to claim 1, wherein said vinyl cyanide compound is at least one member selected from the group consisting of acrylonitrile and methacrylonitrile.

18. A composition according to claim 2, wherein said vinyl cyanide compound is at least one member selected from the group consisting of acrylonitrile and methacrylonitrile.

19. A composition according to claim 1, wherein said vinyl cyanide compound is acrylonitrile.

20. A composition according to claim 2, wherein said vinyl cyanide compound is acrylonitrile.

21. A composition according to claim 1, wherein the rubber moiety of said elastomeric rubber phase is at least one member selected from the group consisting of a polybutadiene, a styrene-butadiene copolymer, an ethylenepropylene-ethylidene norbornene terpolymer and an ethylenepropylene-dicyclopentadiene terpolymer.

22. A composition according to claim 2, wherein the rubber moiety of said elastomeric rubber phase is at least one member selected from the group consisting of a polybutadiene, a styrene-butadiene copolymer, an ethylenepropylene-ethylidene norbornene terpolymer and an ethylenepropylene-dicyclopentadiene terpolymer.

* * * * *